(12) United States Patent
Zhou et al.

(10) Patent No.: US 12,474,484 B2
(45) Date of Patent: Nov. 18, 2025

(54) POS HIGH-ACCURACY POSITIONING METHOD UNDER OCCLUSION

(71) Applicant: GUILIN UNIVERSITY OF TECHNOLOGY, Guangxi (CN)

(72) Inventors: Guoqing Zhou, Guangxi (CN); Jianwu Liu, Guangxi (CN); Jiasheng Xu, Guangxi (CN); Ertao Gao, Guangxi (CN); Xinkun Yuan, Guangxi (CN)

(73) Assignee: GUILIN UNIVERSITY OF TECHNOLOGY, Guangxi (CN)

( * ) Notice: Subject to any disclaimer, the term of this patent is extended or adjusted under 35 U.S.C. 154(b) by 0 days.

(21) Appl. No.: 18/434,754

(22) Filed: Feb. 6, 2024

(65) Prior Publication Data

US 2024/0280707 A1    Aug. 22, 2024

Related U.S. Application Data

(63) Continuation of application No. PCT/CN2023/135334, filed on Nov. 30, 2023.

(51) Int. Cl.
G01S 19/37    (2010.01)
G01S 19/25    (2010.01)
G01S 19/53    (2010.01)

(52) U.S. Cl.
CPC .......... *G01S 19/37* (2013.01); *G01S 19/256* (2013.01); *G01S 19/53* (2013.01)

(58) Field of Classification Search
CPC ........ G01S 19/37; G01S 19/256; G01S 19/53; G01S 5/01; G01S 19/393; G01S 19/49;
(Continued)

(56) References Cited

U.S. PATENT DOCUMENTS

| 11,287,531 B2 * | 3/2022 | Bennington | H04L 67/12 |
| 2012/0139775 A1 * | 6/2012 | Popovic | G01S 19/23 |
| | | | 342/173 |
| 2017/0269231 A1 | 9/2017 | Dai et al. | |

FOREIGN PATENT DOCUMENTS

| CN | 102279404 A | 12/2011 |
| CN | 106093992 A | 11/2016 |

(Continued)

OTHER PUBLICATIONS

Zhai, R., & Yuan, Y. (2022). A Method of Vision Aided GNSS Positioning Using Semantic Information in Complex Urban Environment. Remote Sensing, 14(4), 869. https://doi.org/10.3390/rs14040869 (Year: 2022).*

*Primary Examiner* — Vladimir Magloire
*Assistant Examiner* — Remash R Guyah
(74) *Attorney, Agent, or Firm* — WCF IP

(57) ABSTRACT

The present invention discloses a POS high-accuracy positioning method under occlusion, comprising: integrating single-point positioning data and differential correction data for solution to acquire high-accuracy position information; implementing a buffer through an RAM of an FPGA to cache the collected position information and a sampling time; when a satellite signal loss is detected by a system, fetching five pieces of position information from the RAM at a time before the signal is lost and five pieces of position information at a time after the signal is reappeared, and filtering the information to obtain filtered data; constructing an equation by using the filtered data, and estimating a signal lost position. By triggering an occlusion algorithm through the FPGA, the present invention improves an ability of a POS system to work in areas with weak satellite signals and meanwhile reduces an operation time, thereby meeting practical needs.

7 Claims, 3 Drawing Sheets

(58) Field of Classification Search
CPC .......... G01S 19/28; G01S 19/22; G01S 19/43; G01S 19/23; G01C 21/16
USPC ........................................ 342/357.2–357.78
See application file for complete search history.

(56) References Cited

FOREIGN PATENT DOCUMENTS

| | | | |
|---|---|---|---|
| CN | 108871314 | A | 11/2018 |
| CN | 110763229 | A | 2/2020 |
| CN | 111879280 | A | 11/2020 |
| CN | 114266826 | A | 4/2022 |
| CN | 115096303 | A | 9/2022 |
| CN | 115168781 | A | 10/2022 |
| CN | 115184969 | A | 10/2022 |
| CN | 115685275 | A | 2/2023 |

* cited by examiner

POS HIGH-ACCURACY POSITIONING METHOD UNDER OCCLUSION

CROSS-REFERENCE TO RELATED APPLICATION

This application is a continuation of PCT application NO. PCT/CN2023/135334 filed on Nov. 30, 2023, which claims the priority benefit of China application No. 202211415430.0 filed on Nov. 11, 2022. The entirety of each of the above-mentioned patent applications is hereby incorporated by reference herein and made a part of this specification.

TECHNICAL FIELD

The present invention relates to the technical field of positioning, in particular to a POS high-accuracy positioning method under occlusion.

BACKGROUND

As an important part of a mobile measuring system, a POS system provides real-time spatial position and attitude information, which enables laser point cloud and image data obtained by the mobile measuring system to obtain the geographic coordinates. The POS system is an integrated navigation system composed of an inertial measurement unit (IMU) and a global positioning system (GPS). The IMU acquires angular velocity and acceleration information of a carrier in real time, and can obtain motion parameters such as position, velocity and attitude of the carrier. A GNSS (Global Navigation Satellite System) can provide high-accuracy position information of the carrier. The combination of the two can provide real-time position and attitude services. At present, research on dynamic accuracy of the POS system is mainly carried out from two aspects: analyzing the accuracy of the POS system by analyzing performances of the GNSS and the IMU; and analyzing the accuracy of the POS system by combining a final mapping quality of the mobile measuring system of the POS system. However, in a practical application scenario, when the POS system measures position and attitude information of a carrying apparatus that travels to an area with weak satellite signal such as a high building, no satellite signal can be received, i.e., the GPS signal is occluded by high building. This will lead to being prevented from knowing an accurate position of the carrying apparatus, thus affecting a coordinate measurement task. In order to solve a problem of position information loss for the carrying apparatus under an occluded condition, the present invention proposes a POS high-accuracy positioning method under occlusion, which can estimate positioning data for an occluded object at which the satellite signal is lost.

SUMMARY

In view of the above problems, the present invention discloses a POS high-accuracy positioning method under occlusion, which can implement acquisition of high-accuracy position information of a carrying apparatus under an occluded environment.

The design solutions of the present invention are as follows:

The POS high-accuracy positioning method under occlusion is implemented with a hardware logic device in a system. The system is mainly composed of a central control unit, a GNSS positioning control unit, an IMU attitude measurement unit, an Internet of Things control unit, and a storage unit. This method refers to a positioning and attitude apparatus that can acquire high-accuracy position and attitude information of a carrying apparatus in an occluded environment, and can continuously operate for a long time.

Specific occlusion processing is carried out with the steps below:

- step 1: calculating a delay time for data sampling from a received SV (Sampled Value) message, and obtaining an accurate sampling time Tsample in combination with a receiving time of an SV message header;
- step 2: arranging an RAM (Random Access Memory) buffer in an FPGA (Field-Programmable Gate Array) to cache sampled GNSS positioning data and the sampling time Tsample;
- step 3: when a positioning information loss is detected by a system, searching out top five points from the buffer and temporarily storing the points in a register;
- step 4: once the positioning information is detected again, storing top five pieces of position information in the register, and using a filtering algorithm to filter out noise from ten points in the register; and
- step 5: calculating the filtered data using an occlusion algorithm to calculate out unknown parameters of a fitted curve equation at a signal lost position, and substituting a sampling time Tshield at an unknown point to calculate position information for an occluded object at an occluded position.

Preferably, the sampling delay information includes: a maximum sampling delay Tdelay, and a sampling message receiving time Tarr, and the sampling time Tsample is denoted as: Tsample=Tarr−Tdelay.

Preferably, the time Tshield, at which the position information is lost, is capable of being estimated through the occlusion algorithm, and the occlusion algorithm has a function of occluding.

Preferably, the occluded positioning method is denoted as:

$$P(t) = \begin{bmatrix} t^3 & t^2 & t & 1 \end{bmatrix} \begin{bmatrix} -\alpha & 2-\alpha & \alpha-2 & \alpha \\ 2\alpha & \alpha-3 & 3-2\alpha & -\alpha \\ -\alpha & 0 & \alpha & 0 \\ 0 & 1 & 0 & 0 \end{bmatrix} \begin{bmatrix} P_{-1} \\ P_0 \\ P_1 \\ P_2 \end{bmatrix}$$

Preferably, five pieces of latest position information and sampling times are cached in the buffer.

Preferably, the noise is capable of being filtered out from the ten points in the register by a filtering module, and the filtering module is composed of a received data register, an ROM (Read Only Memory) module, and a related operation module.

Preferably, a central control system is attached with a plurality of UART (Universal Asynchronous Receiver/Transmitter) communication interfaces which are capable of communicating with a GPS positioning control system, an attitude measurement system, an Internet of Things control system, and a storage system.

Preferably, a GNSS module in a GNSS positioning control unit is a full-system eight-frequency high-accuracy positioning and orientation module that supports BDS (Beidou Navigation Satellite System) B1/B2, GPS (Global Positioning System) L1/L2, GLONASS (Global Navigation Satellite System) L1/L2 and Galileo (Galileo satellite navigation system) E1/E5b satellite signals.

Preferably, the GNSS module supports single-system independent positioning and multi-system joint positioning, and enables all of visible satellites of four systems (BDS, GPS, GLONASS, Galileo) to participate in RTK and heading algorithms.

Preferably, an Internet of Things control system supports Mobile 5G, 4G and 3G, Unicom 5G, 4G, and 3G, and Telecom 5G, 4G, and 3G access, and supports TCP (Transmission Control Protocol) connection, and dynamic domain name and IP (Internet Protocol) address access.

The present invention at least includes the following beneficial effects.

Compared with the existing POS system, the present invention (1) integrates differential correction data to correct single-point positioning data to acquire high-accuracy position information with a positioning accuracy up to 1 cm; and (2) is implemented by hardware, wherein a hardware logic device is used to implement the algorithm which has a high operating efficiency, and can estimate lost position points in the case that the satellite signal is lost, thus improving a working performance of the system under a severe environment.

DETAILED DESCRIPTION

Figure 1:
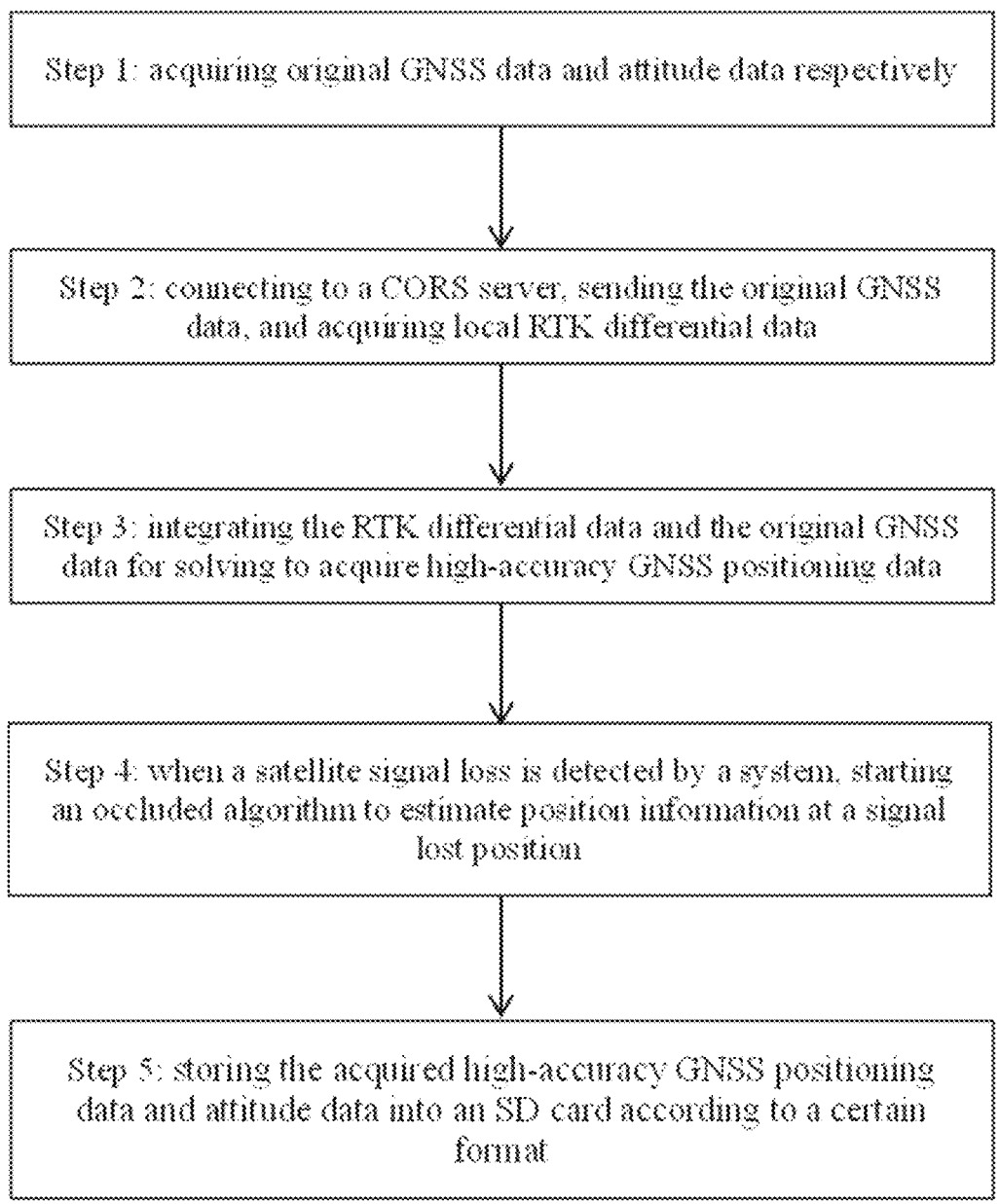
FIG. 1 is a step diagram of the present invention.
Figure 2:
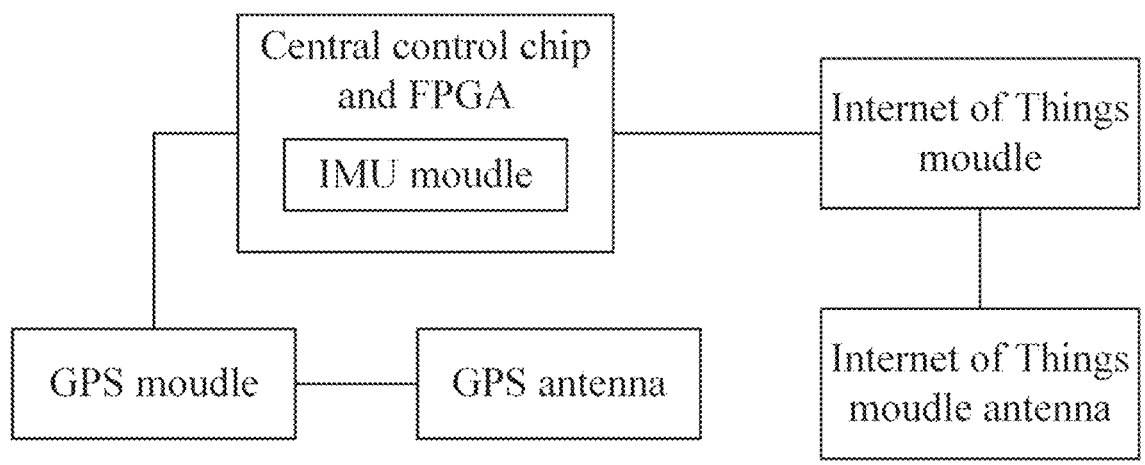
FIG. 2 is a diagram showing an actual circuit connection of the present invention.
Figure 3:
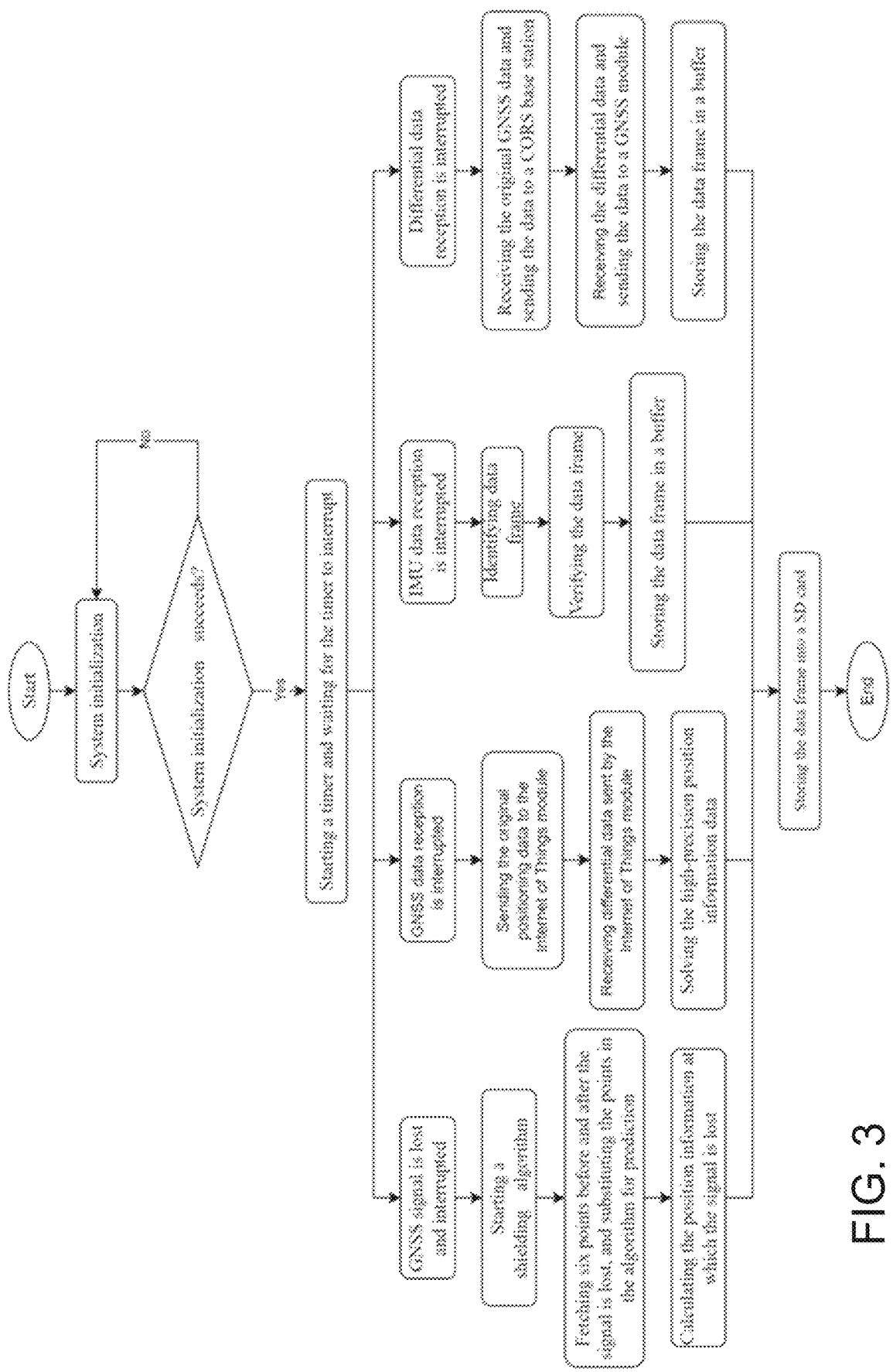
FIG. 3 shows working steps for a POS high-accuracy positioning method under occlusion proposed by the present invention.

In order to make the objects, technical solutions, and advantages of the present invention clearer, specific implementation details of a POS high-accuracy positioning method under occlusion are described below, and the specific design principle of the present invention is further explained in detail in conjunction with the accompanying drawings.

The POS high-accuracy occluded positioning method under occlusion is implemented with a hardware logic device in a system. The system is mainly composed of a central control unit, a GNSS positioning control unit, an FPGA unit, an Internet of Things control unit, and a storage unit. This method refers to a positioning and attitude apparatus that can acquire high-accuracy position and attitude information of a carrying apparatus in an occluded environment, and can continuously operate for a long time.

The central control unit: the central control unit is responsible for controlling a workflow of the entire system, startup of each module, sending of instructions, and transmission and encryption of data. The POS high-accuracy positioning method under occlusion takes an STM32 single-chip microcomputer as a main processing core, a serial port communication as a primary data transmission method, and an SD (Secure Digital Memory) card as a storage medium to complete acquisition, storage and encryption of GNSS position information, acceleration, angular velocity, and other attitude information of a carrying apparatus. A main control flow is as follows:

step 1: acquiring original single-point positioning data and attitude data, wherein the single-point positioning data is acquired by a GNSS module, and the attitude data is acquired by an IMU module;

step 2: acquiring differential correction data, wherein an Internet of Things module is connected to a CORS (Cross-Origin Resource Sharing) server, the single-point positioning data is sent to the CORS server, and the CORS server returns differential correction data of a nearest base station nearby;

step 3: performing differential solving, wherein the single-point positioning data and the differential correction data are fused and solved to obtain real-time high-accuracy position and attitude information;

step 4: once a position signal loss is detected, using a filtering occlusion algorithm to estimate position information at a lost position; and step 5: storing the collected position and attitude information, and outputting the information via a serial port.

The STM32 is selected as a main control chip, and an UART communication method is mainly used in the whole system to communicate with each module. Four UART communication interfaces, which are COM1 (Communication Port 1), COM2, COM3 and COM5 respectively, of the chip are used to integrate the whole system.

The GNSS positioning control unit: the GNSS positioning control unit is mainly responsible for sending control instructions and transmitting data streams of the GNSS module. The GNSS positioning module supports full-system multi-frequency RTK positioning, and can simultaneously track multiple frequencies such as BDS B1/B2 (B3), GPS L1/L2, GLONASS L1/L2, Galileo E1/E5b and QZSS (Quasi-Zenith Satellite System).

An IMU attitude measurement system unit: the IMU attitude measurement unit (including a three-axis gyroscope, a three-axis accelerometer, and a three-axis magnetic sensor) can implement real-time attitude measurement to the carrying apparatus. The IMU module can implement a dynamic roll and pitch accuracy of 0.1°, a non-reference heading accuracy of 0.15°, and a magnetic reference heading accuracy of 0.3°, and meet requirements of the high-accuracy attitude. A frame structure of the attitude data includes five parts: a frame header, a timestamp, a data length, data and a check code. The data frame here is verified and parsed in an interruption way.

The Internet of Things control unit: the Internet of Things module connects to a COM2 of a central control board card. The module supports Mobile 5G, 4G and 3G, Unicom 5G, 4G and 3G, and Telecom 5G, 4G and 3G access, supports TCP connection, and dynamic domain name and IP address access, and supports multiple working modes such as NET (Network), HTTP (HyperText Transfer Protocol), MQTT (Message Queuing Telemetry Transport) and RNDIS (Remote Network Driver Interface Specification), so that SIM (Subscriber Identity Module) cards of each operator can be easily replaced.

To acquire RTK data through the Internet of Things, the first step is to connect to a CORS base station. A commonly used base station either uses a self-erected mobile station or uses a CORS system. The CORS system is an infrastructure for surveying and mapping information through RTK (Real-time Kinematic) carrier phase difference technology. The principle is that satellite data measured on a reference station is sent to a mobile GNSS receiver, and a GNSS positioning apparatus that receives a differential signal processes the data in real time to obtain positioned position information. The connection to the CORS base station requires first connecting to the Internet via a TCP/IP (Transmission Control Protocol/Internet Protocol (protocol, accessing an IP address of a website, and sending an account and a password, and establishing a connection with the CORS base station. Original GNSS data of a mobile apparatus is sent to the CORS base station, and the CORS base station may send RTK differential data of a nearest position to a client.

The storage unit: the present invention uses an FATFS (File Allocation Table File System) file management system as a memory management system and an SD card as a storage medium. The FATFS file management system is ported to the central control unit to implement convenient file reading and writing by calling a series of application interface functions such as f_open, f_read, f_write, and f_close, which are provided to a user by the FATFS file system. The storage unit supports SD card storage, and can store data.

For the occlusion processing: when a GNSS satellite signal cannot be received, five pieces of position information before the signal is lost and five pieces of position information after the signal is reappeared are selected, the position information both before and after the signal are lost is preprocessed to filter out the noise before the signal is lost, and then the data at the lost position is calculated by fusing the occlusion algorithm to estimate the lost position information.

Specific occlusion processing is carried out with the several steps below.

1. A delay time Tdelay for data sampling is calculated from a received SV message, and an accurate sampling time Tsample is acquired in combination with a receiving time Tarr of an SV message header through an equation formula that Tsample=Tarr−Tdela;

it is necessary to be further illustrated that the SV is sampled once every 200 μs.

2. An RAM buffer is arranged in an FPGA to cache sampled GNSS positioning data and the sampling time Tsample.

3. When a positioning information loss is detected by a system, top five points are searched out from the buffer and temporarily stored in a register.

4. Once the positioning information is detected again, top five pieces of position information are stored in the register, and a filtering algorithm is used to filter out noise from ten points in the register, wherein the filtering module is composed of a received data register, an ROM module, and a related operation module, and a detailed description will then be made to the modules and their cooperation.

(1) One received data register 1 having a length L1 (equal to 5) built to store latest five sampled data; and one received data register 2 having a length L2 (equal to 5) is built to store the latest five sampled data when the signal just appears.

(2) One ROM module having a depth (equal to 5) and a width (equal to 5*2) is built to store a matrix used in operation.

(3) A covariance $P_{\bar{k}}$ between an actual value and an estimated value of the system is calculated by using a multiplier, an adder and a matrix operation module, wherein A is a system state transition matrix and Q is a process noise variance matrix.

$$P_k^- = AP_k A^T + Q \qquad (1)$$

(4) A covariance $P_k$ between the actual value and an optimal estimated value of the system is calculated as above, wherein H is a state observation matrix.

$$P_k = (1 - HK) * P_k^- \qquad (2)$$

(5) A filter gain K of the system is calculated as above, wherein H is a state observation matrix.

$$K^- = P_k^- H^T (H P_k^- H^T + R)^{-1} \qquad (3)$$

(6) A prior state estimated value $\tilde{x}_{\bar{k}}$ and a posterior state estimated value $\tilde{x}_{\bar{k}}$ of the system are obtained as above, wherein B is the control input matrix.

$$\tilde{x}_{\bar{k}} = A * \tilde{x}_{\bar{k}} + B * u_k \qquad (4)$$

$$\tilde{x}_k = \tilde{x}_k^- + K(z_k - H * \tilde{x}_k^-) \qquad (5)$$

(7) The filtered data are obtained by a state description equation of the system, wherein $\omega_{k-1}$ is process noise and $v_k$ is a measurement noise.

$$x_k = A * x_{k-1} + B * u_k + \omega_{k-1} \qquad (6)$$

$$z_k = H * x_k + v_k \qquad (7)$$

5. The filtered data is calculated by using an occlusion algorithm, two data P(−1) and P(0) obtained before the signal is lost and two data P(1) and P(2) obtained after the signal is lost are stored in the set register; unknown parameter of a fitted curve equation at a signal lost position are calculated out by using a matrix operation module, and substituted in a sampling time Tshield at an unknown point to calculate position information at an occluded position. Further, the occlusion algorithm is denoted as:

$$P(t) = \begin{bmatrix} t^3 & t^2 & t & 1 \end{bmatrix} \begin{bmatrix} -\alpha & 2-\alpha & \alpha-2 & \alpha \\ 2\alpha & \alpha-3 & 3-2\alpha & -\alpha \\ -\alpha & 0 & \alpha & 0 \\ 0 & 1 & 0 & 0 \end{bmatrix} \begin{bmatrix} P_{-1} \\ P_0 \\ P_1 \\ P_2 \end{bmatrix} \qquad (8)$$

wherein P(−1) and P(2) are control points, which satisfy the following equations, and α is a parameter between 0 and 1, indicating a degree of parallelism between a tail of a curve and the control point.

$$P(0) = P_0$$

$$P(1) = P_1$$

$$P'(0) = \alpha(P_1 - P_{-1})$$

$$P'(1) = \alpha(P_2 - P_0) \qquad (9)$$

Four position information data at an occluded position after filtering are selected to build a curve from the occluded position P(0) to the occluded position P(1). A curve equation P(t) for the occluded positions is built, wherein P(−1) and P(2) are control points, which satisfy the following equation, and α is a parameter between 0 and 1, indicating a degree of parallelism between the tail of the curve and the control point. An appropriate value is adjusted and selected to minimize an error of the system.

The above embodiments are only used to illustrate the present invention, but are not intended to limit the present invention. Those of ordinary skills in the art can make various changes and modifications without departing from the spirit and scope of the present invention. Therefore, all equivalent technical solutions also belong to the scope of the present invention, and the patent protection scope of the present invention should be defined by the claims.

The technical contents not described in detail in the present invention are all known in the art.

What is claimed is:

1. A positioning method under occlusion for a position and orientation system (POS), comprising following steps of:
   step 1: calculating a delay time for data sampling from a received sampled value (SV) message, and obtaining an accurate sampling time Tsample in combination with a receiving time of an SV message header;
   step 2: arranging a RAM buffer in an FPGA to cache sampled GNSS positioning data and the sampling time Tsample;
   step 3: searching out, in response to a positioning data loss being detected by the POS, five positioning data immediately before the positioning data loss, from the buffer and temporarily storing the five positioning data in a register;
   step 4: storing, in response to detecting positioning data again, top five positioning data detected again in the register so that the register has ten positioning data, and using a filtering algorithm to filter out noise from the ten positioning data in the register; and
   step 5: calculating filtered data by using an occlusion algorithm to calculate out a coefficient α of a fitted curve equation at an occluded position, and substituting an occluded sampling time t at the occluded position in the fitted curve equation with the calculated coefficient to calculate an occluded positioning datum P(t) at the occluded position;

wherein the occlusion algorithm is denoted as:

$$P(t) = [t^3 \; t^2 \; t \; 1] \begin{bmatrix} -\alpha & 2-\alpha & \alpha-2 & \alpha \\ 2\alpha & \alpha-3 & 3-2\alpha & -\alpha \\ -\alpha & 0 & \alpha & 0 \\ 0 & 1 & 0 & 0 \end{bmatrix} \begin{bmatrix} P_{-1} \\ P_0 \\ P_1 \\ P_2 \end{bmatrix}.$$

wherein two positioning data P(−1) and P(0) detected immediately before the positioning data loss and top two positioning data P(1) and P(2) detected again after the positioning data loss are stored in the register, wherein P(−1) and P(2) are control points, the coefficient α is a parameter between 0 and 1, indicating a degree of parallelism between a tail of a fitted curve and the control points, and a value of the coefficient α is adjusted to minimize an error of the POS, and the P(−1), P(0), P(1) and P(2) satisfy following equation:

$$P(0) = P_0,$$

$$P(-1) = P_{-1},$$

$$P(2) = P_2,$$

$$P(1) = P_1,$$

$$P'(0) = \alpha(P_1 - P_{-1}),$$

$$P'(1) = \alpha(P_2 - P_0).$$

2. The positioning method under occlusion for the POS according to claim 1, wherein the sampling delay information comprises a maximum sampling delay Tdelay, and a sampling message receiving time Tarr, and the sampling time Tsample is denoted as: Tsample=Tarr−Tdelay.

3. The positioning method under occlusion for the POS according to claim 1, wherein five pieces of latest positioning data and sampling times are cached in the buffer.

4. The positioning method under occlusion for the POS according to claim 1, wherein the noise is capable of being filtered out from the ten points in the register by the filtering algorithm.

5. The positioning method under occlusion for the POS according to claim 1, wherein a GNSS module in a GNSS positioning control unit is an eight-frequency positioning and orientation module that supports BDS B1/B2, GPS L1/L2, GLONASS L1/L2 and Galileo E1/E5b satellite signals.

6. The positioning method under occlusion for the POS according to claim 1, wherein a GNSS module supports single-system independent positioning and multi-system joint positioning, and enables all visible satellites of four systems to participate in RTK and heading algorithms.

7. The positioning method under occlusion for the POS according to claim 1, wherein the sampled GNSS positioning data is a fused data, the fused data is obtained by:
   acquiring a single-point positioning data by a GNSS module;
   connecting an Internet of Things module with a Cross-Origin Resource Sharing (CORS) server, sending the single-point positioning data to the CORS server, and receiving differential correction data of a nearest base station to the POS from the CORS server; and
   fusing the single-point positioning data and the differential correction data to obtain the fused data.

* * * * *